United States Patent
Baraldi

(10) Patent No.: US 10,247,612 B2
(45) Date of Patent: Apr. 2, 2019

(54) DETECTING DEVICE

(71) Applicant: TOTAL THERMAL VISION S.r.l., Bentivoglio (Bologna) (IT)

(72) Inventor: Luca Baraldi, Bologna (IT)

(73) Assignee: Total Thermal Vision S.R.L., Bentivoglio (Bologna) (IT)

( * ) Notice: Subject to any disclaimer, the term of this patent is extended or adjusted under 35 U.S.C. 154(b) by 0 days.

(21) Appl. No.: 15/580,128

(22) PCT Filed: Jun. 9, 2016

(86) PCT No.: PCT/IB2016/053395
§ 371 (c)(1),
(2) Date: Dec. 6, 2017

(87) PCT Pub. No.: WO2016/199057
PCT Pub. Date: Dec. 15, 2016

(65) Prior Publication Data
US 2018/0136045 A1    May 17, 2018

(30) Foreign Application Priority Data

Jun. 12, 2015  (IT) .................. 102015000023357

(51) Int. Cl.
*G01J 5/06*  (2006.01)
*G01J 5/00*  (2006.01)
(Continued)

(52) U.S. Cl.
CPC ............ *G01J 5/061* (2013.01); *G01J 5/004* (2013.01); *G01J 5/029* (2013.01); *G01J 5/042* (2013.01);
(Continued)

(58) Field of Classification Search
CPC ............ G01J 5/061; G01J 5/004; G01J 5/029
See application file for complete search history.

(56) References Cited

U.S. PATENT DOCUMENTS 4,933,543 A * 6/1990 Hull ..................... G01J 3/02
                                                          250/214 C
2011/0310240 A1   12/2011 Sudano et al.

FOREIGN PATENT DOCUMENTS

EP    0488262 A1   6/1992
EP    1535034 A2   6/2005
(Continued)

OTHER PUBLICATIONS

International Search Report and Written Opinion dated Nov. 29, 2016 from counterpart PCT Application No. PCT/IB2016/053395.

*Primary Examiner* — Hugh Maupin
(74) *Attorney, Agent, or Firm* — Shuttleworth & Ingersoll, PLC; Timothy Klima

(57) ABSTRACT

A device for detecting at least one thermographic image including a thermal camera sensitive to infrared radiation for acquiring the thermographic image; a protective case, inside which the thermal camera is inserted, having a window through which the thermal camera is able to acquire the thermographic image; a screen, positioned outside the protective case and movable between a first operating position at which it is superposed on the window to protect it from environmental disturbances and a second operating position wherein it is shifted from the window, allowing the thermal camera to acquire the thermographic image; a pneumatic system for supplying air inside the protective case having an inlet outside the protective case; a computerized command and control unit; the pneumatic system includes means for adjusting and distributing the air operating inside the protective case and in communication with the external inlet controlled by the computerized command and control unit.

11 Claims, 3 Drawing Sheets

(51) Int. Cl.
  *G01J 5/04*   (2006.01)
  *G01J 5/02*   (2006.01)
  *G01J 5/08*   (2006.01)
  *H04N 5/225*  (2006.01)
  *H04N 5/33*   (2006.01)

(52) U.S. Cl.
  CPC ............... *G01J 5/043* (2013.01); *G01J 5/048* (2013.01); *G01J 5/0806* (2013.01); *G01J 5/0834* (2013.01); *H04N 5/2252* (2013.01); *H04N 5/33* (2013.01); *G01J 2005/0077* (2013.01); *G01J 2005/0081* (2013.01)

(56) References Cited

FOREIGN PATENT DOCUMENTS

| WO | WO2004011891 A2 | 2/2004 |
| WO | WO2006108708 A2 | 10/2006 |

* cited by examiner

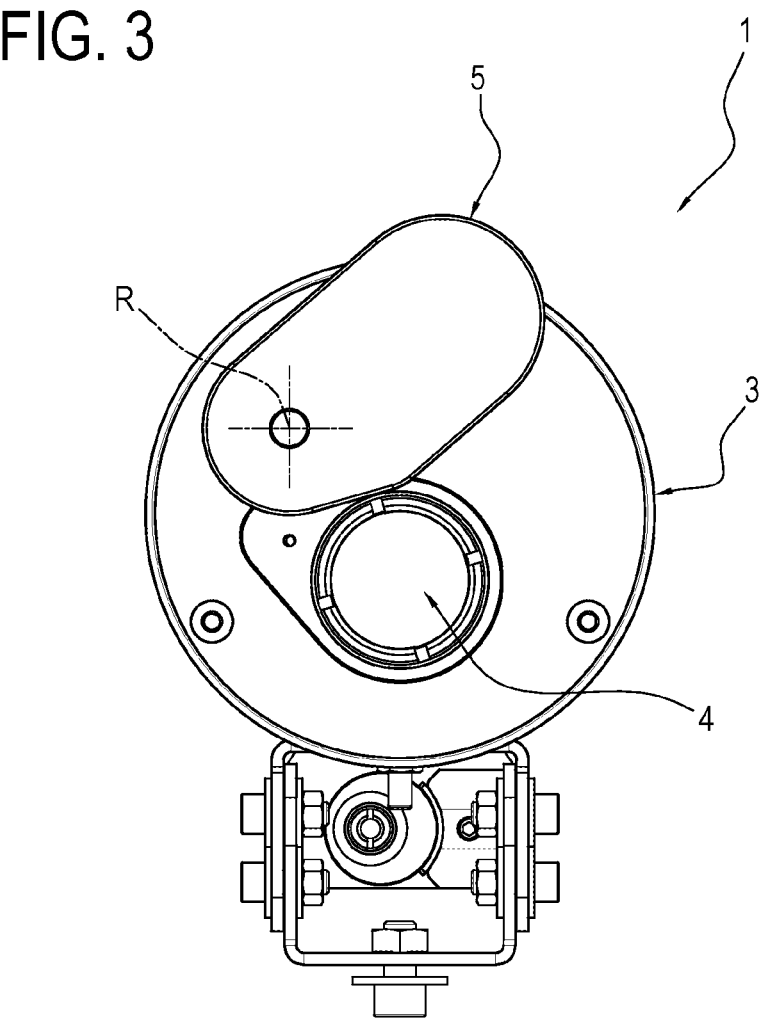

DETECTING DEVICE

This application is the National Phase of International Application PCT/IB2016/053395 filed Jun. 9, 2016 which designated the U.S.

This application claims priority to Italian Patent Application No. 102015000023357 filed Jun. 12, 2015, which application is incorporated by reference herein.

TECHNICAL FIELD

This invention relates to a detecting device and in particular a device for detecting a thermographic image preferably for a metallurgical plant, for example dedicated to die casting.

BACKGROUND ART

The die casting plants in question generally comprise at least one die, consisting of two half-dies, into which the molten metal is injected. The die is kept closed by hydraulic presses for the entire duration of the injection and is opened at the end of the injection for extracting the cooled and solidified piece.

A known device for detecting thermographic images and intended for a metallurgical plant is described, for example, in patent document EP1535034 which relates to a system for controlling technological processes to optimise operating temperatures.

The detecting device comprises a radiation sensor, for example comprising a so-called thermal camera, which is directed at a respective half-die.

When opening the die, the radiation sensor, which is sensitive in particular to infrared radiation, acquires thermological parameters, in particular by acquiring a thermographic image, of a surface of the half-die.

The data acquired is sent to a computerised command and control unit, in communication with the detecting device, by means of corresponding wiring, for subsequent processing.

The detecting device comprises a protective case inside of which is housed the thermal camera which is thus protected from environmental disturbances typical of die casting processes.

The case is provided with a window, closed for example by a germanium lens, through which the thermal camera is capable of acquiring the above-mentioned thermographic images.

The detecting device comprises a shutter or screen of the above-mentioned window to protect it in turn from the ambient disturbances during operation of the plant.

The shutter is movable between a first operating configuration wherein the window is open, that is, thermal camera has a clear field of vision for acquiring the thermographic images, and a second operating position wherein the window is closed and protected.

The detecting device comprises a pneumatic system in communication with the inside of the case to cool the radiation sensor and in communication with the outside of the case, at the window, in order to keep the closing lens clean.

The prior art solutions have some drawbacks.

The pneumatic system comprises a unit for distribution of the air in communication with a source of compressed air and a plurality of pipes for feeding air from the distribution unit to the protective case.

The distribution unit is located outside the protective case and, to prevent excessive pressure losses, the unit must be positioned relatively close to the case and the sensor, approximately within ten meters, thus limiting the possibility of setting up the control system.

The cooling of the radiation sensor is performed by continuously injecting air inside the case with a consequent relatively high consumption of air and a cooling of the sensor which is not entirely optimum.

The pipes for supplying the air to the protective case are positioned outside the case and the distribution unit and are therefore exposed to the environmental disturbances and are therefore particularly subject to faults.

In this context, the main aim of this invention is to obviate the above-mentioned drawbacks.

DISCLOSURE OF THE INVENTION

The aim of the invention is to provide a device for detecting a thermographic image which is more versatile than the prior art solutions and more freely positionable relative to a respective source of air.

Another aim of this invention is to provide a device for detecting a thermographic image which is more robust and reliable than prior art solutions.

The technical purpose indicated and the aims specified are substantially achieved by a device for detecting a thermographic image as disclosed herein.

BRIEF DESCRIPTION OF DRAWINGS

Further features and advantages of the invention are more apparent in the non-limiting description which follows of a preferred embodiment of a device for detecting a thermographic image as illustrated in the accompanying drawings, in which:

FIG. 3 illustrates a second configuration of the detecting device of the previous drawings is a schematic front view and with some parts cut away for greater clarity.

DETAILED DESCRIPTION OF PREFERRED EMBODIMENTS OF THE INVENTION

Figure 1:
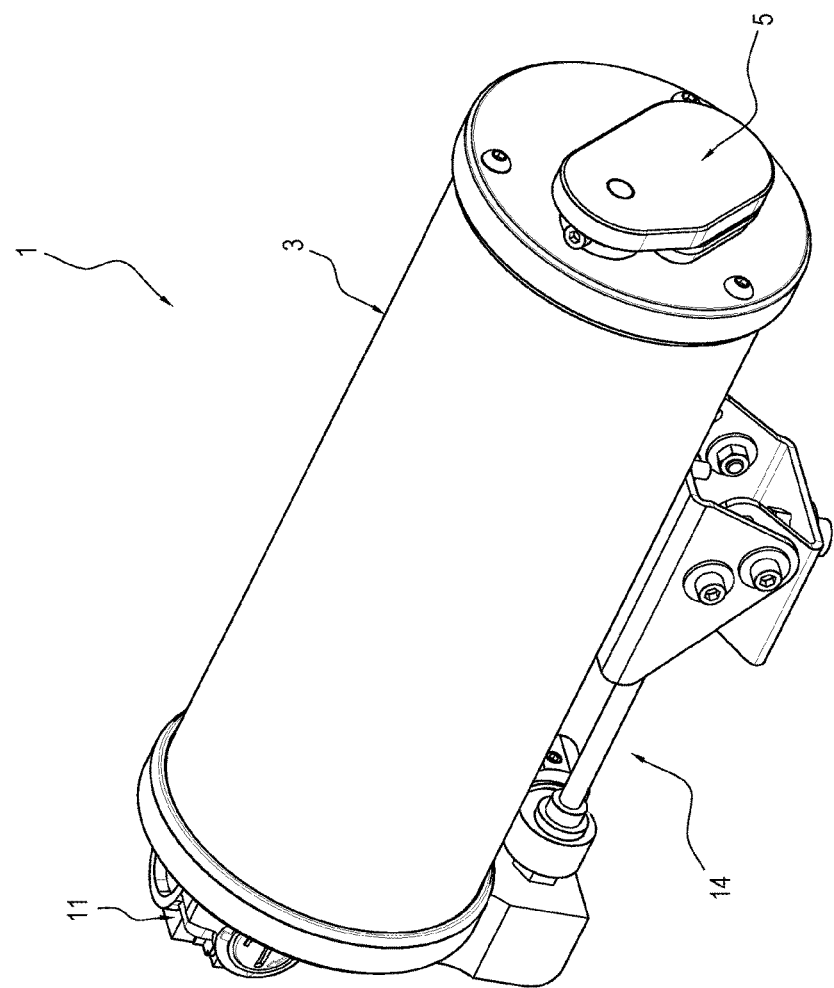
FIG. 1 illustrates a first configuration of a detecting device according to this invention, in a schematic perspective view partly in blocks and with some parts cut away for greater clarity.

With reference to the accompanying drawings, the numeral 1 denotes a device for detecting a thermographic image preferably for a metallurgical plant, for example dedicated to die casting.

The die casting plants in question generally comprise at least one die, consisting of two half-dies, into which the molten metal is injected. The die is kept closed by hydraulic presses for the entire duration of the injection and is opened at the end of the injection for extracting the cooled and solidified piece.

The device 1 is suitable for use in any type of casting process such as, for example, low pressure casting, by gravity, in dies and the like.

The device 1 comprises a thermal camera sensitive to infrared radiation, labelled with a corresponding block 2, for acquiring the thermographic images; the thermal camera 2 is of a substantially known type and not described further.

The thermal camera 2 is equipped with a focussing device, not illustrated, and the device 1 comprises a drive unit for the focussing device applied to the thermal camera and schematically represented as a block 2a.

The device 1 comprises a protective case labelled 3, inside of which is inserted the thermal camera 2.

The case 3 is used, in particular, to protect the thermal camera 2 from the ambient disturbances normally present in the plants where the device 1 is preferably used.

With particular reference to FIG. 3, it should be noted that the protective case 3 has a window 4 through which the thermal camera 2 is able to acquire the thermographic image.

The window 4 is preferably protected by a germanium lens suitable for use in situations with very high temperatures.

The device 1 comprises a screen 5 located outside the case 3 and movable between a first operating position at which it is superposed on the window 4, illustrated for example in FIG. 1, and a second operating position, illustrated in FIG. 3, in which it is shifted from the window 4 to allow the thermal camera 2 to acquire the thermographic image.

In the embodiment illustrated, the screen 5 is constrained to the case 3 and is able to rotate about an axis R, perpendicular to the plane of FIG. 3, to pass between the first and the second operating positions.

The device 1 comprises a pneumatic motor, schematically represented as a block 6, for moving the screen 5 between the above-mentioned first and second operating positions.

The device 1 comprises a pneumatic system for supplying compressed air, generically denoted by numeral 7, to supply compressed air inside the case 3 for a plurality of functions described below.

The pneumatic system 7 comprises an inlet connector 8 for a connection to a source of compressed air outside the case 3 and schematically represented as a block 9; the connector 8 defines, in practice, an inlet for air compressed into the case 3.

The device 1 also comprises a computerised command and control unit, schematically represented as a block 10, configured to command and control the device 1 as described in more detail below.

In particular, for example, the unit 10 constitutes a Programmable Logic Controller (PLC) specialised in the management or control of the device 1.

The case 3 is equipped with a connector 11 in communication with the computerised unit 9 to allow an exchange of data and commands between the unit 10 and the inside of the case 3.

Preferably, the connector 11 is configured for a connection to the computerised unit 9 by an Ethernet line for transmitting thermographic images and a data line for transmitting commands.

The computerised unit 10 is in effect in communication with the thermal camera 2 for reception of the thermographic images and, preferably, with the drive unit 2a for any adjustments to the focussing device.

Preferably, the device 1 comprises, inside the case 3, an electronic card, schematically represented as a block 10a, in communication with the computerised unit 10 and acting, in a substantially known manner, as interface between the unit 10 and the components to be controlled or with which to communicate inside the case 3.

For convenience of description, reference is made below to a direct connection of the separate components with the unit 10 whilst, preferably, the connection is carried out by means of the card 10a.

The above-mentioned pneumatic system 7 comprises means 12 for adjusting and distributing air operating inside the protective case 3 and in communication with the connector 8 to receive the compressed air from the source 9.

As described in more detail below, the unit 10 is configured to control the adjusting and distributing means 12.

The adjusting and distributing means 12 comprise a first solenoid valve 13 in communication with the inlet 8.

Downstream of the solenoid valve 13 the pneumatic system comprises a vortex tube 14, or Ranque-Hilsch tube, substantially known and preferably positioned outside the case 3.

The vortex tube 14 has an inlet for compressed air in communication with the solenoid valve 13 using a conduit 13a, an outlet of cooled air in communication with the inside of the case 3 and a free outlet for hot air.

More specifically, the cooled air outlet is in communication with the inside of the case 3 by means of a conduit 15.

The solenoid valve 13 is movable between a first operating configuration at which the vortex tube 14, that is, the conduit 15, is closed or not supplied and a second operating position at which the vortex tube 14, that is, the conduit 15 is open and in communication with the compressed air inlet 8.

The solenoid valve 13 basically adjusts the introduction of fresh air inside the case 3 necessary for cooling the thermal camera 2.

The thermal camera 2 must be maintained at an operating temperature, that is, at a temperature which remains within a maximum value to avoid measurement errors.

Preferably, the device 1 comprises a temperature sensor 16 positioned inside the case 3 and in communication with the computerised unit 10.

The computerised unit 10 is configured to control the solenoid valve 13 between the first and second operating configurations according to the temperature value detected by the temperature sensor 16.

Advantageously, in this way, the cooling air is supplied inside the case 3 only when necessary; the consumption of air is reduced compared with prior art solutions and operation of the thermal camera 2 is optimised.

Preferably, the pressure in the case 3 is maintained at a value higher than the external pressure, that is to say, the case 3 is in over-pressure relative to the outside in such a way as to obstruct an entrance from the outside of contaminating agents.

Preferably, the pressure in the case 3 is kept at a predetermined value by a suitably calibrated vent, not illustrated.

Figure 2:
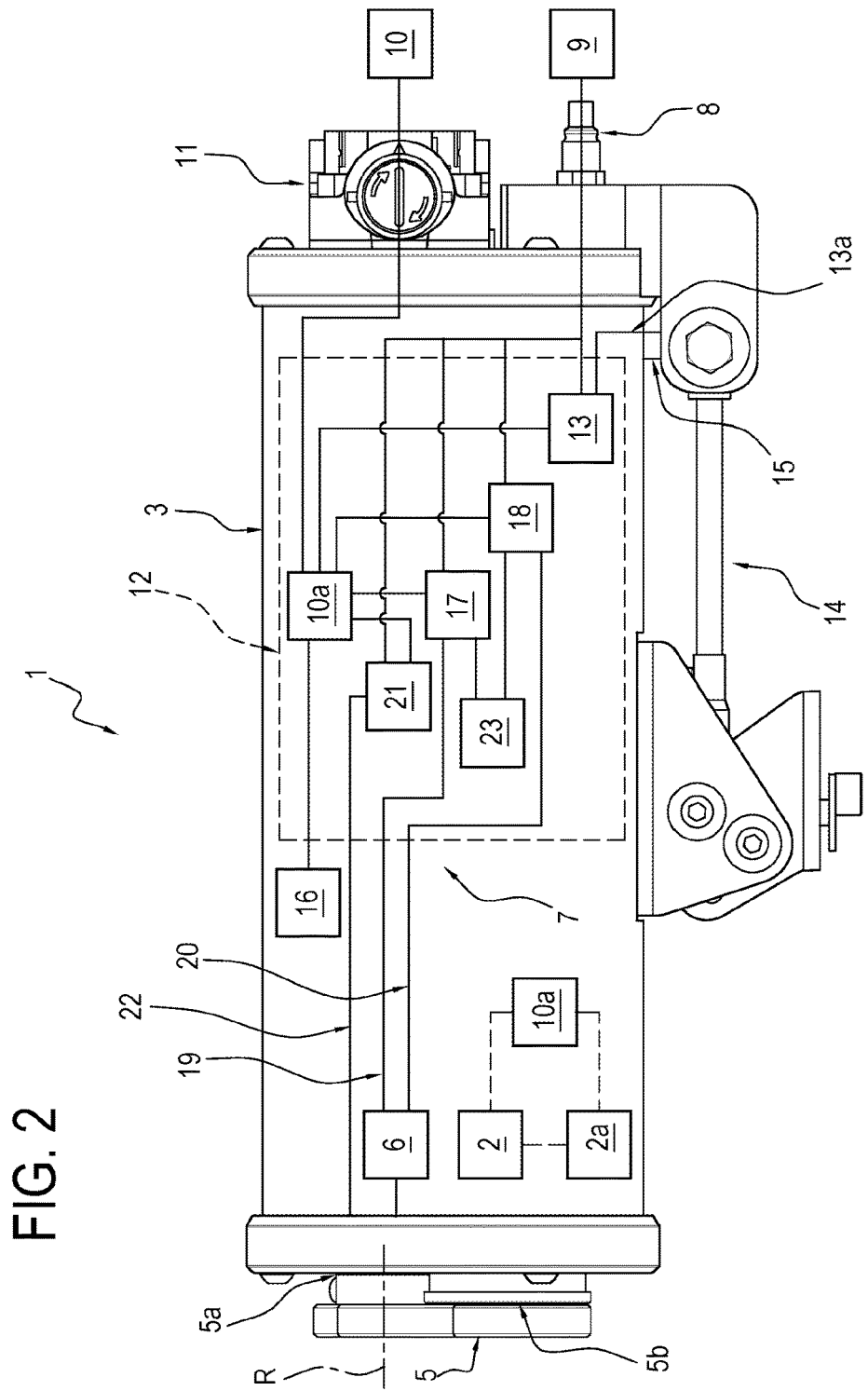
FIG. 2 illustrates the detecting device of FIG. 1 in a schematic side view partly in block with some parts cut away for greater clarity.

As shown in FIG. 2, the means 12 for adjusting and distributing the air comprise a solenoid valve 17 for opening the screen 5 and a solenoid valve 18 for closing the screen, both in communication with the computerised unit 10.

The solenoid valve 17 is in communication with the motor 6 by means of a respective conduit 19 and the solenoid valve 18 is in communication with the motor 6 by means of a respective conduit 20 for supplying compressed air from the inlet 8 to the motor 6.

The solenoid valves 17, 18 are movable between a respective first operating configuration, at which the relative conduits 19, 20 are closed, and a respective second operating position at which the relative conduits 19, 20 are open and in communication with the inlet 8.

In substantially known manner, the compressed air supplied to the pneumatic motor 6 through the solenoid valve 17 and the conduit 19 determines the opening of the screen 5 and the compressed air supplied to the pneumatic motor 6 through the solenoid valve 18 and the conduit 20 causes the closing of the screen 5.

Preferably, the means 12 for adjusting and distributing the air comprise a device for adjusting the speed of opening and closing the screen 5 schematically illustrated with a block 23.

The device 23, which can preferably be set up from outside the case 3 intervenes on the pressure difference between the solenoid valves 17 and 18 determining the opening and closing speed of the screen 5.

Advantageously, the device 23 is regulated in such a way as to dampen any end stop of the screen 5 in the transit from the open position to the closed configuration and vice versa.

In the preferred embodiment illustrated as an example, the pneumatic system 7 comprises the screen 5, that is, the screen 5 defines a conduit for blowing air.

The screen 5 has an inlet 5a, preferably at the axis of rotation R, and an outlet 5b at the window 4 considering the screen 5 in the closed position, as schematically shown in FIG. 2.

The adjusting means 12 comprise a solenoid valve 21, in communication with the computerised unit 10 and with the compressed air inlet 8.

The adjusting means 12 comprise a conduit 22 operating between the solenoid valve 21, and the inlet 5a in the screen 5.

The solenoid valve 21 is movable between a first operating configuration at which the conduit 22 is closed and a second operating position at which the conduit 22 is open and in communication with the inlet 8 and the source 9.

The computerised unit 10 is configured to control the solenoid valve 21 between the first and the second operating configurations for blowing air on the window 4 through the outlet 5b in the screen 5.

In a preferred embodiment, the solenoid valve 21 is kept always open.

In a different embodiment, the solenoid valve 21 is kept open when the screen 5 is in the closed position illustrated in FIG. 1.

The invention described brings important advantages.

The adjustment and distribution of the compressed air actuated by the adjustment means positioned inside the protective case makes the structure as a whole simple.

The absence of external pipes makes the solution more reliable since there are fewer external components which can be subject to faults.

A simple outer connection is sufficient for connecting with a source of compressed air, which may also be located in a remote position relative to the case 3, since the air adjustment/management is performed inside the case and no longer outside.

The external drive unit applied to the thermal camera allows an excellent rationalisation of the spaces inside the case 3 and a general improvement of the cooling.

The data and the commands exchanged between the components inside the case and the computerised command and control unit occurs by means of a single cable connected into the corresponding connector.

The invention claimed is:

1. A detecting device of a thermographic image, comprising:
    a thermal camera sensitive to infrared radiation for acquiring the thermographic image;
    a protective case internally of which the thermal camera is inserted,
    the protective case including a window through which the thermal camera is able to acquire the thermographic image,
    a screen arranged externally of the protective case and mobile between a first operating position in which the screen is superposed on the window to protect the window from environmental disturbances and a second operating position in which the screen is shifted from the window to enable the thermal camera to acquire the thermographic image,
    a pneumatic air supply system internally of the protective case and including an external inlet positioned externally of the protective case,
    wherein the pneumatic air supply system comprises an air adjusting and distributing mechanism positioned and operatively active internally of the protective case and in communication with the external inlet, the air adjusting and distributing mechanism comprising a plurality of solenoid valves in communication with the external inlet and a plurality of conduits in communication with the plurality of solenoid valves,
    a computerised control and command unit for controlling and commanding the plurality of solenoid valves.

2. The detecting device of claim 1, wherein the air adjusting and distributing mechanism comprises:
    a first conduit of the plurality of conduits for blowing air internally of the protective case and cooling at least the thermal camera, and
    a first solenoid valve of the plurality of solenoid valves operatively active between the external inlet and the first conduit for supplying air to the first conduit, the first solenoid valve being movable between a first operating configuration at which the first conduit is closed and a second operating configuration at which the first conduit is open and in communication with the external inlet,
    the computerised control and command unit being programmed to control the first solenoid valve to move between the first and second operating configurations.

3. The detecting device of claim 2, and further comprising:
    a temperature sensor positioned internally of the protective case and in communication with the computerised control and command unit,
    the computerised control and command unit being programmed to control the first solenoid valve to move between the first and second operating configurations as a function of a temperature value detected by the temperature sensor.

4. The detecting device of claim 3, and further comprising:
    a vortex tube interposed between the first solenoid valve and the protective case,
    an inlet for compressed air of the vortex tube being in communication with the first solenoid valve, and
    an outlet for cooled air of the vortex tube being in communication with the first conduit,
    at least a portion of the vortex tube being positioned externally of the protective case.

5. The detecting device of claim 2, and further comprising:
    a vortex tube interposed between the first solenoid valve and the protective case,
    an inlet for compressed air of the vortex tube being in communication with the first solenoid valve, and
    an outlet for cooled air of the vortex tube being in communication with the first conduit,
    wherein at least a portion of the vortex tube is positioned externally of the protective case.

6. The detecting device of claim 1, and further comprising:
- a pneumatic motor for actuating the screen to move between the first and the second operating positions,
- wherein the air adjusting and distributing mechanism further comprises a second conduit of the plurality of conduits in communication with the pneumatic motor for supplying the pneumatic motor and a second solenoid valve of the plurality of solenoid valves operatively active between the external inlet and the second conduit for supplying air to the second conduit, the second solenoid valve being movable between a first operating configuration at which the second conduit is closed and a second operating configuration at which the second conduit is open and in communication with the external inlet.

7. The detecting device of claim 1, wherein:
- the pneumatic air supply system comprises the screen, and the screen includes a screen inlet for blowing air in communication with an inside of the protective case, and an outlet for blowing air outside the protective case,
- the air adjusting and distributing mechanism comprises a third conduit of the plurality of conduits in communication with the screen inlet and a third solenoid valve of the plurality of solenoid valves operatively active between the external inlet and the third conduit for supplying air to the screen, the third solenoid valve being movable between a first operating configuration at which the third conduit is closed and a second operating configuration at which the third conduit is open and in communication with the external inlet,
- the computerised control and command unit is programmed to control the third solenoid valve to move between the first and second operating configurations to blow air onto the window through the outlet in the screen.

8. The detecting device of claim 7, wherein the computerised control and command unit is programmed to control the third solenoid valve to move between the first and second operating configurations to blow air onto the window through the outlet in the screen when the screen is in the first operating position.

9. The detecting device of claim 1, wherein:
- the thermal camera comprises a focussing device,
- the detecting device comprises a motorization for the focussing device applied to the thermal camera,
- the computerised control and command device is configured to pilot the motorization.

10. The detecting device of claim 1,
- wherein the air adjusting and distributing mechanism comprises:
  - a first conduit of the plurality of conduits for blowing air internally of the protective case and cooling at least the thermal camera, and
  - a first solenoid valve of the plurality of solenoid valves operatively active between the external inlet and the first conduit for supplying air to the first conduit, the first solenoid valve being movable between a first operating configuration at which the first conduit is closed and a second operating configuration at which the first conduit is open and in communication with the external inlet, said computerised control and command unit being programmed to control the first solenoid valve to move between the first and second operating configurations,
- wherein the detecting device further comprises:
  - a vortex tube interposed between the first solenoid and the protective case,
  - an inlet for compressed air of the vortex tube being in communication with the first solenoid valve and an outlet for cooled air of the vortex tube being in communication with the first conduit,
  - at least a portion of the vortex tube being positioned externally of the protective case,
  - wherein the pneumatic air supply system comprises the screen, the screen including a screen inlet for blowing air in communication with an inside of the protective case,
  - an outlet for blowing air outside the protective case,
  - wherein the air adjusting and distributing mechanism comprises a third conduit of the plurality of conduits in communication with the screen inlet and a third solenoid valve of the plurality of solenoid valves operatively active between the external inlet and the third conduit for supplying air to the screen, the third solenoid valve being movable between a first operating configuration at which the third conduit is closed and a second operating configuration at which the third conduit is open and in communication with the external inlet,
  - wherein the computerised control and command unit is programmed to control the third solenoid valve to move between the first and second operating configurations to blow air onto the window through the outlet in the screen.

11. The detecting device of claim 10, wherein the computerised control and command unit is programmed to control the third solenoid valve to move between the first and second operating configurations to blow air onto the window through the outlet in the screen when the screen is in the first operating position.

* * * * *